United States Patent
Uchino et al.

(10) Patent No.: US 10,168,630 B2
(45) Date of Patent: Jan. 1, 2019

(54) TONER FOR DEVELOPING ELECTROSTATIC IMAGES

(71) Applicant: Konica Minolta, Inc., Tokyo (JP)

(72) Inventors: Satoshi Uchino, Hino (JP); Shinya Obara, Fuchu (JP); Futoshi Kadonome, Sagamihara (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/916,896

(22) Filed: Mar. 9, 2018

(65) Prior Publication Data

US 2018/0267416 A1 Sep. 20, 2018

(30) Foreign Application Priority Data

Mar. 17, 2017 (JP) .................. 2017-052518

(51) Int. Cl.
  *G03G 9/097* (2006.01)
  *G03G 9/08* (2006.01)
  *C01F 17/00* (2006.01)
  *C01G 23/00* (2006.01)
  *G03G 9/093* (2006.01)

(52) U.S. Cl.
  CPC ....... *G03G 9/0825* (2013.01); *C01F 17/0012* (2013.01); *C01G 23/006* (2013.01); *G03G 9/0819* (2013.01); *G03G 9/09321* (2013.01); *C01P 2004/64* (2013.01)

(58) Field of Classification Search
  CPC .......................... G03G 9/097; G03G 9/09708
  See application file for complete search history.

(56) References Cited

U.S. PATENT DOCUMENTS 5,296,324 A * 3/1994 Akagi .................. G03G 9/0827
                                                         430/108.7

FOREIGN PATENT DOCUMENTS

JP          2003277054 A    10/2003

* cited by examiner

*Primary Examiner* — Hoa V Le
(74) *Attorney, Agent, or Firm* — Lucas & Mercanti, LLP

(57) ABSTRACT

A toner for developing electrostatic images, including toner particles containing an external additive on surfaces of toner matrix particles. The external additive contains at least a lanthanum-containing titanate compound.

10 Claims, 1 Drawing Sheet

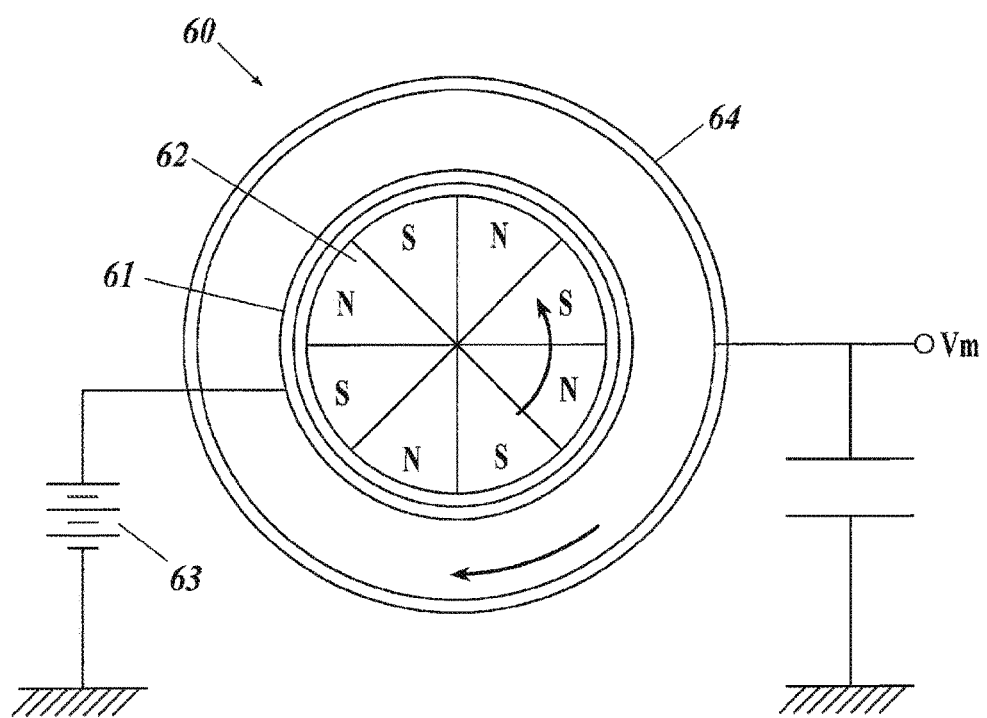

TONER FOR DEVELOPING ELECTROSTATIC IMAGES

BACKGROUND

1. Technological Field

The present invention relates to toners for developing electrostatic images. More specifically, the present invention relates to a toner for developing electrostatic images which reduces a variation in charge amount caused by different temperatures and different humidities, and reduces image stripes, fogging, and scattering of the toner.

2. Description of the Related Art

Recent imaging apparatuses have been required for high print rates, high image quality, and high durability. These imaging apparatuses should have increased individual process rates for image formation and have include long-lived constituent components in view of high-definition images and reduced cost.

In electrophotographic imaging, an electrostatic latent image formed on an electrostatic latent image carrier (hereinafter, also referred to as "photoreceptor"), which is one of the constituent components in the imaging apparatus, is developed with a toner for developing electrostatic images (hereinafter, also referred to as "toner") into a visual image. The toner usually includes toner matrix particles, and an external additive disposed on the surfaces of the toner matrix particles to impart fluidity to the toner and control the charge of the toner.

The external additive widely used is titanium dioxide ($TiO_2$), which serves as a charge controller. Unfortunately, titanium dioxide has a large Mohs hardness of 5.5 to 7.5 and a specific gravity of 3.9 to 4.0 $g/cm^2$, and thus it readily scratches the surface of the photoreceptor, obstructing the long life of the photoreceptor.

Titanate compounds are also known as a material for the external additive. The compounds have charging characteristics similar to those of titanium dioxide and have a Mohs hardness lower than that of titanium dioxide (for example, Japanese Patent Application Laid-Open No. 2003-277054). Although the titanate compounds have a Mohs hardness of 3.0 to 5.0, which is lower than that of titanium dioxide, rectangular particles of the titanate compounds readily scratch the surface of the photoreceptor, also obstructing the long life of the photoreceptor.

A toner containing an external additive having such characteristics roughens the surface of the photoreceptor by scratches generated during printing on a large number of sheets, resulting in image stripes, fogging, and scattering of the toner. Such circumstances lead to a demand for a toner containing an external additive which has a charge control function, and can reduce the surface of the photoreceptor to prevent image stripes, fogging, and scattering of the toner.

SUMMARY

The present invention has been made in consideration of the problems and circumstances described above. An object of the present invention is to provide a toner which reduces a variation in charge amount caused by different temperatures and different humidities, and reduces image stripes, fogging, and scattering of the toner.

The present inventors, who have conducted extensive research to solve the problems, have found that a toner including toner particles containing an external additive containing at least a lanthanum-containing titanate compound on surfaces of toner matrix particles can reduce a variation in charge amount caused by different temperatures and humidities, and can prevent image stripes, fogging, and scattering of the toner, and have completed the present invention.

In other words, the present invention solves the problems by the following means.

To achieve at least one of the abovementioned objects, according to an aspect of the present invention, a toner for developing electrostatic images, including toner particles containing an external additive on surfaces of toner matrix particles, wherein the external additive contains at least a lanthanum-containing titanate compound.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, and wherein:

FIG. 1 is a schematic view illustrating an average charge amount analyzer.

DETAILED DESCRIPTION OF EMBODIMENTS

Hereinafter, one or more embodiments of the present invention will be described with reference to the drawings. However, the scope of the invention is not limited to the disclosed embodiments.

The methods according to the present invention can provide a toner which can reduce a variation in charge amount caused by different temperatures and humidities, and can prevent image stripes, fogging, and scattering of the toner, and have achieved the present invention.

The present inventors infer the following expression mechanism or action mechanism of the advantageous effects of the present invention although the mechanism is not completely clarified.

The toner according to the present invention contains an external additive of a titanate compound doped with a lanthanum compound (hereinafter, also referred to as "lanthanum-containing titanate compound") on the surfaces of toner matrix particles.

Particles of the lanthanum-containing titanate compound used as the external additive can be formed into a substantially spherical shape. The present inventors believe that use of such an external additive can prevent excess wear or scratch of the constituent components, such as the photoreceptor, in the imaging apparatus. The present inventors also believe that such an external additive can prolong the service lives of the constituent components and can prevent image stripes, fogging, and scattering of the toner.

The present inventors further believe that the titanate compound doped with a lanthanum compound reduces the electric resistance of particles, enhancing the function as a charge controller.

The toner for developing electrostatic images according to the present invention includes toner particles containing an external additive on surfaces of toner matrix particles, wherein the external additive contains at least a lanthanum-containing titanate compound. This technical feature is common to the following embodiments.

In the embodiments according to the present invention, the lanthanum-containing titanate compound preferably has a number average primary particle diameter within the range of 10 to 100 nm. The lanthanum-containing titanate compound can effectively function as a charge controller through control of the number average primary particle diameter to be 10 nm or more, and can ensure the advantageous effects of the present invention through control of the number average to be 100 nm or less, without abrasion by the toner.

In the embodiments according to the present invention, the titanic acid compound containing lanthanum preferably has an average circularity within the range of 0.82 to 1.0 to improve the fluidity of the toner and prevent the abrasion of the surface of the photosensitive drum (hereinafter referred to as merely "surface abrasion") by the toner.

In the embodiments according to the present invention, the lanthanum-containing titanate compound preferably adheres to the surfaces of the toner matrix particles with an average adhesion strength within the range of 50 to 100%. If the average adhesion strength is 50 mass % or more, lanthanum-containing strontium titanate particles are barely detached from the toner matrix particles. Accordingly, the strength can prevent roughening of the surface of the photoreceptor caused by the surface abrasion of the photoreceptor with particles detached from the toner matrix particles, and thus effectively prevent image defects.

In the embodiments according to the present invention, the lanthanum-containing titanate compound preferably contains lanthanum in an amount within the range of 3.4 to 14.9 mass %. If the lanthanum content is 3.4 mass % or more, particles of the titanate compound can have a substantially spherical shape to further reduce the surface abrasion characteristics by the toner. If the lanthanum is 14.9 mass % or less, the particle diameter can be readily controlled, preventing generation of coarse particles of the external additive and reducing the surface abrasion by the toner.

In the embodiments according to the present invention, the lanthanum-containing titanate compound contained is preferably lanthanum-containing strontium titanate for ease of control of the particle diameter.

In the embodiments according to the present invention, the lanthanum-containing titanate compound contained is preferably lanthanum-containing calcium titanate for ease of control of the particle diameter.

In the embodiments according to the present invention, the lanthanum-containing titanate compound is preferably contained in an amount within the range of 0.1 to 1.0 mass % relative to the total amount of the toner for developing electrostatic images to reduce a variation in charge amount under environments at different temperatures and humidities.

In the embodiments according to the present invention, titanium dioxide ($TiO_2$) is preferably contained in an amount of less than 0.1 mass % relative to the total amount of the toner for developing electrostatic images to prevent a reduction in charge amount and prevent the scattering of the toner and the generation of fogging.

In the embodiments according to the present invention, the toner matrix particles preferably contain at least a vinyl resin to reduce a variation in charge amount under environments at different temperatures and humidities.

The present invention and its constituent and embodiments for achieving the present invention will now be described in detail.

Throughout the specification "to" between two numerical values indicates the lower limit includes the numeric value before "to" and the upper limit includes the numeric value after "to".

[Outline of Toner for Developing Electrostatic Image]

The toner for developing electrostatic images according to the present invention includes toner particles containing an external additive on surfaces of toner matrix particles, wherein the external additive contains at least a lanthanum-containing titanate compound.

In the present invention, the term "toner" indicates a collective entity of "toner particles".

<Toner Matrix Particles>

The toner matrix particles according to the present invention includes a binder resin, and internal additives, such as a colorant, a mold releasing agent, and a charge controller, contained in the binder resin. The toner matrix particles also contain an external additive.

In this specification, the toner matrix particles containing an external additive are referred to as toner particles.

<External Additive>

The external additive for the toner according to the present invention contains at least a lanthanum-containing titanate compound.

(Lanthanum-Containing Titanate Compound)

Preferred lanthanum-containing titanate compounds are lanthanum-containing potassium titanate, lanthanum-containing barium titanate, lanthanum-containing calcium titanate, lanthanum-containing magnesium titanate, lanthanum-containing lead titanate, lanthanum-containing aluminum titanate, and lanthanum-containing lithium titanate. Particularly preferred are lanthanum-containing calcium titanate, lanthanum-containing strontium titanate, and lanthanum-containing magnesium titanate in view of ease of control of the particle diameter.

The lanthanum-containing titanate compound preferably contains lanthanum in an amount within the range of 3.4 to 14.9 mass %. A lanthanum content of 3.4 mass % or more results in particles of the titanate compound having a substantially spherical shape, reducing the surface abrasion by the toner. A lanthanum content of 14.9 mass % or less facilitates the control of the particle diameter of the titanate compound, preventing the generation of coarse particles and reducing the surface abrasion by the toner.

The titanate compound lanthanum-containing may be compounded in the toner in any amount. The content is preferably within the range of 0.1 to 1.0 mass % relative to the total amount of the toner. Such a content can provide an advantageous effect, i.e., a small variation in charge amount under environments at different temperatures and humidities.

(Number Average Primary Particle Diameter of Lanthanum-Containing Titanate Compound)

The lanthanum-containing titanate compound preferably contains primary particles having a number average diameter within the range of 10 to 100 nm. The lanthanum-containing titanate compound can effectively function as a charge controller through control of the number average primary particle diameter to be 10 nm or more, and can impart appropriate surface abrasion characteristics to the toner through control of the number average primary particle diameter to be 100 nm or less.

(Determination of Number Average Primary Particle Diameter)

The number average primary particle diameter of the lanthanum-containing titanate compound as an external additive is determined as follows: An external additive is added to (dispersed in) the toner particles, and 100 primary particles of the external additive are observed with an scanning electron microscope "JSM-7401F" (available from JEOL, Ltd.) at a magnification of 40000×. The primary particles are subjected to image analysis to measure the major diameter and the minor diameter of each particle. The intermediate value between the major diameter and the minor diameter is defined as a sphere equivalent diameter of the particle. The average of 100 primary particle diameters is defined as the number average primary particle diameter.

(Average Circularity of Lanthanum-Containing Titanate Compound)

The lanthanum-containing titanate compound preferably has an average circularity within the range of 0.82 to 1.0. An average circularity controlled within this range can achieve a toner having improved fluidity and appropriate surface abrasion characteristics.

(Determination of Average Circularity)

The average circularity of the lanthanum-containing titanate compound as an external additive is determined as follows: 100 particles of the lanthanum-containing titanate compound are photographed with a scanning electron microscope "JSM-7401F" (available from JEOL, Ltd.) at a magnification of 40000×, and the photographic image is taken into an image analyzer "LUZEX (registered trademark) AP" (available from NIRECO CORPORATION) with a scanner. The photographic image is subjected to image analysis with the image analyzer.

From the analyzed image, the circle equivalent perimeters of the particles and the perimeters thereof are determined, the circularities of the particles of the external additive (lanthanum-containing titanate compound) are determined from Expression (1) to determine the average circularity.

$$\text{circularity} = (\text{circle equivalent perimeter})/(\text{observed perimeter}) = [2 \times (A\pi)^{1/2}]/PM \quad \text{Expression (1):}$$

where A represents the projected area of a particle of the external additive (lanthanum-containing titanate compound), and PM represents the perimeter of the particle of the external additive (lanthanum-containing titanate compound). A circularity of 1.0 represents a true sphere. A lower circularity indicates that the particle has more irregularities in the outer periphery and has a shape farther away from the true sphere.

(Average Adhesion Strength of Lanthanum-Containing Titanate Compound to Surfaces of Toner Matrix Particles)

The lanthanum-containing titanate compound preferably adheres to the surfaces of the toner matrix particles with an average adhesion strength within the range of 50 to 100%. Particles of lanthanum-containing strontium titanate having an average adhesion strength of 50% or more are barely detached from the toner matrix particles. Such an adhesion strength can prevent the roughening of the surface of the photoreceptor caused by the particles detached from the surface of the photoreceptor, and thus effectively prevent image defects.

(Determination of Average Adhesion Strength)

The average adhesion strength of the lanthanum-containing titanate compound as an external additive adhesion to the toner matrix particles is calculated by the following measurement of the amount of titanium atoms present in the toner before and after ultrasonic dispersion of the toner in an aqueous surfactant solution for three minutes.

A toner (3 g) is wetted with an aqueous solution (40 g) of 0.2 mass % polyoxyethyl phenyl ether placed in a 100 mL plastic cup. In an ultrasonic homogenizer "US-1200" (available from NIHONSEIKI KAISHA LTD.), ultrasonic energy is adjusted such that the ammeter attached to the ultrasonic homogenizer indicates 60 μA (50 W), and is applied for three minutes to ultrasonically disperse the toner. In the next step, the toner is separated with a filter having an opening of 1 μm, is washed with 60 mL of pure water, and is dried.

The amount of residual titanium atoms in the sample after drying (hereinafter, referred to as sample A) is measured with a wavelength dispersive X-ray fluorescence analyzer "XRF-1700" (available from SHIMADZU Corporation). In a specific measurement process, the dried sample A (2 g) is pelletized under pressure. The pellets are subjected to qualitative analysis on the following conditions. In the analysis, the Kα peak angle of the target element is determined from a 2θ table.

Conditions of Spectrometer
Slit: standard
Attenuator: none
Dispersive crystal: LiF
Detector: SC A sample (hereinafter, referred to as sample B) is prepared from toner (3 g) as in the sample A except that the toner is not ultrasonically dispersed, and the amount of titanium atoms in the sample B is also analyzed.

The net intensity of the Kα ray of Ti in the sample A is divided by the net intensity of the Kα of Ti in the sample B to calculate the residual Ti rate. The residual Ti rate is defined as the average adhesion strength.

<Preparation of Lanthanum-Containing Titanate Compound>

An example method of preparing a lanthanum-containing titanate compound will be described, but the method should not be construed to be limitative.

The lanthanum-containing strontium titanate nanopowder usable as the external additive is typically prepared by a process of preparing a perovskite titanate compound according to a normal pressure heating reaction method. A mineral acid peptized article of a hydrolysate of a titanium compound is used as a titanium dioxide source, a water-soluble acidic compound is used as a strontium source, and a water-soluble acidic compound is used as a lanthanum source. These compounds are reacted while an aqueous alkali solution is being added to a mixed solution of these compounds at 50° C. or more.

The titanium dioxide source to be used is a mineral acid peptized article of a hydrolysate of a titanium compound. Specifically, metatitanate prepared by a sulfuric acid process and having an $SO_3$ content of 1.0 mass % or less, preferably 0.5 mass % or less is adjusted to a pH of 0.8 to 1.5 with hydrochloric acid, and is peptized. This disintegrated metatitanate is preferably used to prepare a strontium titanate nanopowder having a sharp distribution.

The strontium source to be used may be strontium nitrate or strontium chloride, for example.

The lanthanum source to be used may be lanthanum nitrate hexahydrate or lanthanum chloride heptahydrate, for example.

The aqueous alkali solution to be used may be caustic alkali, and preferred is an aqueous sodium hydroxide solution.

Examples of factors which affect the particle diameter of the lanthanum-containing strontium titanate nanopowder prepared by the method described above include the mixing proportion of the titanium dioxide source, the strontium source and the lanthanum source in the reaction, the initial content of the titanium dioxide source in the reaction, and the temperature and rate of the aqueous alkali solution during addition thereof. These factors can be appropriately adjusted according to the target particle diameter and particle size distribution.

In order to prevent the generation of strontium carbonate during the reaction process, the reaction is preferably performed under a nitrogen gas atmosphere that blocks carbon dioxide gas.

The molar ratio ($SrO/TiO_2$) of the strontium source to the titanium dioxide source in the reaction is within the range of preferably 0.9 to 1.4, particularly preferably 0.95 to 1.15.

The lanthanum content in the lanthanum-containing titanate compound can be controlled by the content of the lanthanum source in the reaction. In the present invention, a preferred lanthanum content is within the range of 3.4 to 14.9 mass %.

The molar content of the titanium dioxide source ($TiO_2$) in the reaction is within the range of preferably 0.05 to 1.0 mol/L, particularly preferably 0.1 to 0.8 mol/L.

Although a higher temperature during the addition of the aqueous alkali solution results in higher crystallinity, an appropriate temperature for practical use is within the range of 50 to 101° C.

The addition rate of the aqueous alkali solution has the largest influence on the particle diameter of the resulting powder. A lower addition rate results in a larger particle diameter of the powder of the lanthanum-containing strontium titanate while a higher addition rate results in a smaller particle diameter of the powder of strontium titanate. The addition rate of the aqueous alkali solution is preferably 0.001 to 1.0 equivalent/h, more preferably 0.005 to 0.5 equivalent/h relative to the raw materials prepared. The addition rate is appropriately adjusted according to the target particle diameter. The addition rate of the aqueous alkali solution may also be varied according to the purpose.

<Surface Modification of Lanthanum-Containing Titanate Compound>

The lanthanum-containing titanate compound may be surface-modified by any process. Examples of a surface modifier used in surface modification include alkylsilazane compounds, such as hexamethyldisilazane; alkylalkoxysilane compounds, such as dimethyldimethoxysilane, dimethyldiethoxysilane, trimethylmethoxysilane, methyltrimethoxysilane, and butyltrimethoxysilane; chlorosilane compounds, such as dimethyldichlorosilane and trimethylchlorosilane; silicone oil; and silicone varnish. These surface modifiers may be used alone or in combination.

In a specific treatment process, for example, a surface modifier is sprayed onto particles of the lanthanum-containing titanate compound according to the present invention, or a vaporized surface modifier is mixed with these particles, and the particles are heat-treated. Water, amine, and other catalysts may be used in this process. This dry surface modification is preferably performed under an atmosphere of an inert gas, such as nitrogen.

Alternatively, a surface modifier is dissolved in a solvent, and is mixed with the lanthanum-containing titanate compound according to the present invention. After dispersion, the mixture is heat-treated when necessary, and is further dried to yield surface-modified particles of the lanthanum-containing titanate compound. In this process, the surface modifier may be added simultaneously or after mixing and dispersion of the particles of the lanthanum-containing titanate compound in the solvent.

<Other External Additives>

The toner according to the present invention may contain other external additives for improving the fluidity and the charging characteristics of the toner in the range not inhibiting the advantageous effect of the present invention, in addition to the lanthanum-containing titanate compound according to the present invention.

Examples of other external additives include inorganic oxide nanoparticles, such as fatty acid metal nanoparticles, silica nanoparticles, alumina nanoparticles, and titanium dioxide nanoparticles.

<Binder Resin>

The binder resin for the toner matrix particles according to the present invention preferably contains an amorphous resin and a crystalline resin. The binder resin may contain only an amorphous resin.

<Amorphous Resin>

The amorphous resin according to the present invention preferably contains a vinyl resin, a urethane resin, or a urea resin. Among these resins, preferred in the present invention is a vinyl resin. This is because the vinyl resin has a main chain composed of carbon atoms, and thus has low compatibility with a crystalline polyester resin preferably used as the crystalline resin described later; therefore, the vinyl resin further reduces the compatibilization of the amorphous resin with the crystalline resin.

The amorphous resin according to the present invention indicates a resin which does not show a melting point in differential scanning calorimetry (DSC) and has a relatively high glass transition temperature (Tg).

In the DSC where the glass transition temperature in the first heating cycle is defined as $Tg_1$ and the glass transition temperature in the second heating cycle is defined as $Tg_2$, the amorphous resin has a glass transition temperature $Tg_1$ of preferably 35 to 80° C., particularly 45 to 65° C. The amorphous resin also has a glass transition temperature $Tg_2$ of preferably 20 to 70° C., particularly preferably 30 to 55° C.

(Vinyl Resin)

The vinyl resin is prepared through polymerization of at least a vinyl monomer.

Specific examples of amorphous vinyl resins include acrylic resins and styrene-acrylic resins. Among these amorphous vinyl resins, preferred are styrene-acrylic resins prepared with a styrene monomer and a (meth)acrylate monomer.

Although specific examples of the styrene monomer and the (meth)acrylate monomer polymerizable into the styrene-acrylic resins will be shown below, the styrene-acrylic resin used in the present invention may be prepared with any other monomer than those listed below.

(1) Styrene Monomer

Examples of the styrene monomer include styrene, o-methylstyrene, m-methylstyrene, p-methylstyrene, α-methylstyrene, p-phenylstyrene, p-ethylstyrene, 2,4-dimethylstyrene, p-tert-butylstyrene, p-n-hexylstyrene, p-n-octylstyrene, p-n-nonylstyrene, p-n-decylstyrene, p-n-dodecylstyrene, and derivatives thereof. These styrene monomers may be used alone or in combination.

(2) (Meth)Acrylate Monomer

Examples of the (meth)acrylate monomer include acrylate monomers, such as methyl acrylate, ethyl acrylate, isopropyl acrylate, n-butyl acrylate, t-butyl acrylate, isobutyl acrylate, n-octyl acrylate, 2-ethylhexyl acrylate, stearyl acrylate, lauryl acrylate, and phenyl acrylate; and methacrylate monomers, such as methyl methacrylate, ethyl methacrylate, n-butyl methacrylate, isopropyl methacrylate, isobutyl methacrylate, t-butyl methacrylate, n-octyl methacrylate, 2-ethylhexyl methacrylate, stearyl methacrylate, lauryl methacrylate, phenyl methacrylate, diethylaminoethyl methacrylate, and dimethylaminoethyl methacrylate.

The content of the styrene-acrylic resin is preferably 70 mass % or more relative to the total amount of the binder resins. A styrene-acrylic resin contained within this range can sufficiently highly improve the charging characteristics of the toner.

A third polymerizable monomer other than the polymerizable monomers described above can also be used. Examples of the third polymerizable monomer include acid monomers, such as acrylic acid, methacrylic acid, maleic anhydride, and vinyl acetate; and other monomers, such as acrylamide, methacrylamide, acrylonitrile, ethylene, propylene, butylenevinyl chloride, N-vinylpyrrolidone, and butadiene.

The polymerizable monomer may be a polyfunctional vinyl monomer. Examples of the polyfunctional vinyl monomer include diacrylate esters of ethylene glycol, propylene glycol, butylene glycol, and hexylene glycol; and dimethacrylates and trimethacrylates of tri- or higher hydric alcohols, such as divinylbenzene, pentaerythritol, and trimethylolpropane.

(Preparation of Styrene-Acrylic Resin)

The styrene-acrylic resin is preferably prepared by emulsion polymerization. In emulsion polymerization, polymerizable monomers, such as styrene and acrylate, are dispersed in an aqueous medium described later, and are polymerized. A surfactant is preferably used to disperse the polymerizable monomers in the aqueous medium. Polymerization may be performed with a known polymerization initiator and a known chain transfer agent.

(Polymerization Initiator)

A variety of known polymerization initiators may be suitably used. Specific examples thereof include peroxides, such as hydrogen peroxide, acetyl peroxide, cumyl peroxide, tert-butyl peroxide, propionyl peroxide, benzoyl peroxide, chlorobenzoyl peroxide, dichlorobenzoyl peroxide, bromomethylbenzoyl peroxide, lauroyl peroxide, ammonium persulfate, sodium persulfate, potassium persulfate, diisopropyl peroxycarbonate, di-t-butyl peroxide, tetralin hydroperoxide, 1-phenyl-2-methylpropyl-1-hydroperoxide, pertriphenylacetic tert-hydroperoxide, tert-butyl performate, tert-butyl peracetate, tert-butyl perbenzate, tert-butyl perphenylacetate, tert-butyl permethoxyacetate, and tert-butyl per-N-(3-toluyl)palmitate; and azo compounds, such as 2,2'-azobis(2-aminodipropane) hydrochloride, 2,2'-azobis(2-aminodipropane)nitrate, 1,1'-azobis(sodium 1-methylbutyronitrile-3-sulfonate), 4,4'-azobis-4-cyanovaleric acid, and poly(tetraethylene glycol-2,2'-azobisisobutyrate).

(Chain Transfer Agent)

Any chain transfer agent may be used: for example, mercaptans, such as octylmercaptan, dodecylmercaptan, alkylmercaptan, and t-dodecylmercaptan; mercaptopropionic acids, such as n-octyl-3-mercaptopropionate, stearyl-3-mercaptopropionate; mercapto-fatty acid esters; and styrene dimers. These chain transfer agents may be used alone or in combination.

The amorphous resin preferably has a weight average molecular weight (Mw) within the range of 10000 to 100000, which is determined by gel permeation chromatography (GPC). In the present invention, the molecular weight of the amorphous resin is determined by GPC as follows.

A sample (amorphous resin) is dissolved in tetrahydrofuran at room temperature with an ultrasonic dispersing machine for five minutes such that the content is 1 mg/mL. In the next step, the solution is filtered with a membrane filter having a pore size of 0.2 μm to prepare a sample solution. In a chromatograph "HLC-8120 GPC" (available from Tosoh Corporation) provided with three columns "TSK guardcolumn+TSKgelSuperHZM-M" (available from Tosoh Corporation), while the column temperature is kept at 40° C., a carrier solvent tetrahydrofuran (THF) flows at a flow rate of 0.2 mL/min. The sample solution (10 μL) with the carrier solvent is injected into the chromatograph. The sample is detected with a refractive index detector (RI detector). The molecular weight distribution of the sample is calculated using a calibration curve produced from monodispersed standard polystyrene particles. The calibration curve is determined with ten standard polystyrenes.

If a hybrid crystalline polyester resin described later is contained as a crystalline resin, the amorphous resin is preferably the same amorphous resin as that used in the hybrid crystalline polyester resin.

In this specification, the term "same resin(s)" indicates resin(s) having a characteristic chemical bond common to the repeating units thereof. In this specification, the term "characteristic chemical bond" is defined according to "Classification of Polymer" specified in National Institute for Materials Science (NIMS) substance material data base (http://polymer.nims.go.jp/PoLyInfo/guide/jp/term_polymer.html). In other words, the "characteristic chemical bond" indicates chemical bonds of the 22 polymers in total classified according to their chemical bonds, including polyacrylic, polyamide, polyacid anhydrides, polycarbonate, polydiene, polyester, polyharoolefin, polyimide, polyimine, polyketone, polyolefin, polyether, polyphenylene, polyphosphazene, polysiloxane, polystyrene, polysulfide, polysulfone, polyurethane, polyurea, polyvinyl, and other polymers.

The term "same resins" in the case of a copolymer resin indicates resin monomers which are structural units of the copolymer resin and have a common characteristic chemical bond in the chemical structures of these monomers. Accordingly, resins having a characteristic chemical bond are considered as the same resins even if those resins have different characteristics from each other or different molar ratios of the monomers for forming the copolymer.

For example, a resin (or resin segment) formed of styrene, butyl acrylate, and acrylic acid and a resin (or resin segment) formed of styrene, butyl acrylate, and methacrylic acid are the same resins because these resins have at least a common chemical bond which forms polyacrylic resin. Further examples of the same resins include resins (or resin segments) formed of styrene, butyl acrylate, and acrylic acid and a resin (or resin segment) formed of styrene, butyl acrylate, acrylic acid, terephthalic acid, and fumaric acid because these resins have at least a common chemical bond which forms polyacrylic resin. Accordingly, these are the same resins.

<Crystalline Resin>

The crystalline resin according to the present invention preferably contains a hybrid crystalline polyester resin composed of a crystalline polyester resin chemically bonded to an amorphous resin.

In the toner according to the present invention containing the hybrid crystalline polyester resin, the content of the hybrid crystalline polyester resin in the toner matrix particle is within the range of preferably 5 to 30 mass %, more preferably 10 to 20 mass %. A preferred content of the hybrid crystalline polyester resin contained in the toner matrix particle is 30 mass % or less. Such a content can avoid insufficient crystal growth of the polyester resin, and results in sufficient crystal growth during the fixing of the toner. A preferred content of the hybrid crystalline polyester resin in the toner matrix particle is 5 mass % or more. Such a content can ensure a sufficient amount of the hybrid crystalline polyester resin needed for crystallization, and results in sufficient crystal growth during the fixing of the toner.

The crystalline resin shows a clear endothermic peak in a thermogram by differential scanning calorimetry (DSC), rather than a stepwise endothermic change. The clear endothermic peak specifically indicates an endothermic peak having a half width of 15° C. or less in the thermogram by differential scanning calorimetry (DSC) at a heating rate of 10° C./min.

<Crystalline Polyester Resin>

The crystalline polyester resin is prepared through a polycondensation reaction of di- or higher valent carboxylic acid (polyvalent carboxylic acid compound) with di- or higher hydric alcohol (polyhydric alcohol compound).

The polyvalent carboxylic acid compound has two or more carboxy groups in one molecule. Alkyl esters of polyvalent carboxylic acid compounds, acid anhydrides, and acid chlorides may be used. Examples of the polyvalent carboxylic acid compound include combinations of divalent carboxylic acids, such as oxalic acid, succinic acid, maleic acid, adipic acid, 3-methyladipic acid, azelaic acid, sebacic acid, nonanedicarboxylic acid, decanedicarboxylic acid, undecanedicarboxylic acid, dodecanedicarboxylic acid, fumaric acid, citraconic acid, diglycolic acid, cyclohexane-3,5-diene-1,2-dicarboxylic acid, malic acid, citric acid, hexahydroterephthalic acid, malonic acid, pimelic acid, tartaric acid, mucic acid, phthalic acid, isophthalic acid, terephthalic acid, tetrachlorophthalic acid, chlorophthalic acid, nitrophthalic acid, p-carboxyphenylacetic acid, p-phenylenediacetate, m-phenylenediglycolic acid, p-phenylenediglycolic acid, o-phenylenediglycolic acid, diphenylacetic acid, diphenyl-p,p'-dicarboxylic acid, naphthalene-1,4-dicarboxylic acid, naphthalene-1,5-dicarboxylic acid, naphthalene-2,6-dicarboxylic acid, anthracenedicarboxylic acid, and dodecenylsuccinic acid; and tri- or higher carboxylic acids, such as trimellitic acid, pyromellitic acid, naphthalenetricarboxylic acid, naphthalenetetracarboxylic acid, pyrenetricarboxylic acid, and pyrenetetracarboxylic acid.

The polyhydric alcohol compound has two or more hydroxy groups in one molecule. Examples of the polyhydric alcohol compound include dihydric alcohol, such as ethylene glycol, propylene glycol, butanediol, diethylene glycol, hexanediol, cyclohexanediol, octanediol, decanediol, dodecanediol, ethylene oxide adducts of bisphenol A, and propylene oxide adducts of bisphenol A; and tri- or higher hydric alcohols, such as glycerol, pentaerythritol, hexamethylolmelamine, hexaethylolmelmelamine, tetramethylolbenzoguanamine, and tetraethylolmelbenzoguanamine.

The crystalline polyester resin may be synthesized with a variety of known catalysts, for example, an esterification catalyst.

Examples of the esterification catalyst include tin compounds, such as dibutyltin oxide and tin(II) 2-ethylhexanoate; and titanium compounds, such as titanium diisopropylate bis(triethanolaminate). Examples of an esterification cocatalyst include gallic acid. The amount of the esterification catalyst to be used is preferably 0.01 to 1.5 parts by mass, more preferably 0.1 to 1.0 part by mass relative to the total amount (100 parts by mass) of the polyhydric alcohol compound, the polyvalent carboxylic acid compound, and a bi-reactive monomer component. The amount of the esterification cocatalyst to be used is preferably 0.001 to 0.5 parts by mass, more preferably 0.01 to 0.1 parts by mass relative to the total amount (100 parts by mass) of the polyhydric alcohol compound, the polyvalent carboxylic acid compound, and the bi-reactive monomer component.

Examples of a combination of the polyvalent carboxylic acid compound and the polyhydric alcohol compound for forming a crystalline polyester resin usable in the present invention include a combination of 1,12-dodecanediol (carbon atoms: 12) and sebacic acid (carbon atoms: 10), a combination of ethylene glycol (carbon atoms: 2) and sebacic acid (carbon atoms: 10), a combination of 1,6-hexanediol (carbon atoms: 6) and dodecanedioic acid (carbon atoms: 12), a combination of 1,9-nonanediol (carbon atoms: 9) and dodecanedioic acid (carbon atoms: 12), and a combination of 1,6-hexanediol (carbon atoms: 6) and sebacic acid (carbon atoms: 10).

The crystalline polyester resin particles have a melting point Tm within the range of preferably 65 to 90° C., more preferably 70 to 80° C. Such crystalline polyester resin particles having a melting point Tm within the range of 65 to 90° C. improve the heat-resistant storage characteristics of the toner without inhibiting the low-temperature fixing characteristics.

(Measurement of Melting Point of Crystalline Polyester Resin)

The melting point of the crystalline polyester resin can be measured with a differential scanning calorimeter (DSC).

The measurement can be performed, for example, with a DSC-7 differential scanning calorimeter (available from PerkinElmer Inc.) and a TAC7/DX thermal analysis controller (available from PerkinElmer Inc.). Specifically, a sample (4.50 mg) is sealed in an aluminum pan (KIT No. 0219-0041). The aluminum pan is set in the sample holder of the "DSC-7" calorimeter. An empty aluminum pan is prepared for the measurement of a reference. The temperature of the sample is controlled in the range of 0 to 200° C. for measurement through a first heating cycle, a cooling cycle, and a second heating cycle at a heating rate of 10° C./min and a cooling rate of 10° C./min. The data in the second heating cycle is collected. The melting point is defined as an endothermic peak temperature.

This process of measuring the melting point of the crystalline polyester resin can also be applied to the measurement of the melting point of the crystalline resin other than the crystalline polyester resin.

<Hybrid Crystalline Polyester Resin>

The hybrid crystalline polyester resin is formed of a crystalline polyester resin chemically bonded to an amorphous resin. In the following description, in the hybrid crystalline polyester resin, the moiety derived from the crystalline polyester resin is referred to as "first resin segment", and the moiety derived from the amorphous resin is referred to as "second resin segment".

The first resin segment is preferably chemically bonded to the second resin segment through a bi-reactive monomer. The first resin segment is composed of a crystalline polyester resin.

(First Resin Segment)

The first resin segment forming the hybrid resin is composed of a crystalline polyester resin prepared with a polycondensation reaction of polyvalent carboxylic acid with polyhydric alcohol in the presence of a catalyst. Specific types of the polyvalent carboxylic acid and the polyhydric alcohol are as described above.

(Second Resin Segment)

The second resin segment forming the hybrid crystalline resin is composed of a resin prepared through polymerization of a monomer forming a second resin. In this specification, the monomer forming a second resin may be any monomer forming an amorphous resin. For example, known monomers, such as the vinyl monomers forming vinyl resin described above, may be used.

The content (hybrid percentage) of the second resin segment in the hybrid crystalline polyester resin is preferably within the range of 0.1 to 30 mass %. A more preferred content is within the range of 0.5 to 10 mass %. A content of 0.1 mass % or more facilitates the crystallization of the hybrid crystalline polyester resin. A content of 30 mass % or less does not enhance the compatibility with the binder resin, and facilitates the crystallization of the hybrid crystalline polyester resin.

The hybrid proportion indicates the proportion of the second resin in the total amount of the structures derived from the first resin, the second resin, and the bi-reactive monomer in the hybrid crystalline polyester resin.

The "bi-reactive monomer" bonds the first resin segment to the second resin segment. The molecule of the "bi-reactive monomer" has both a group forming the first resin segment and selected from the group consisting of hydroxy, carboxy, epoxy, primary amino, and secondary amino groups, and an ethylenically unsaturated group forming the second resin segment. A preferred bi-reactive monomer is preferably a monomer having a hydroxy or carboxy group and an ethylenically unsaturated group. More preferably, the bi-reactive monomer has a carboxy group and an ethylenically unsaturated group. In other words, the bi-reactive monomer is preferably vinylcarboxylic acid.

Specific examples of the bi-reactive monomer include acrylic acid, methacrylic acid, fumaric acid, and maleic acid, and may further include esters of these acids having a hydroxyalkyl (1 to 3 carbon atoms) group. Preferred is acrylic acid, methacrylic acid, or fumaric acid in view of the reactivity. The first resin segment is bonded to the second resin segment through the bi-reactive monomer.

The amount of the bi-reactive monomer to be used is preferably 1 to 10 parts by mass, more preferably 4 to 8 parts by mass relative to the total amount (100 parts by mass) of the monomers for forming the second resin segment to improve the low-temperature fixing characteristics, high-temperature off-set resistance, and durability of the toner.

(Preparation of Hybrid Crystalline Resin)

The hybrid crystalline resin may be prepared by a process according to a known standard scheme. Typical examples of the process include:

(1) A process of preliminarily polymerizing a first resin segment, reacting the first resin segment with a bi-reactive monomer, and further reacting monomers for forming a second resin segment (such as, an aromatic vinyl monomer and a (meth)acrylate monomer) to form a hybrid crystalline resin.

(2) A process of preliminarily polymerizing a second resin segment, reacting the second resin segment with a bi-reactive monomer, and further reacting the resultant with a polyvalent carboxylic acid and a polyhydric alcohol to form a first resin segment.

(3) A process of preliminarily polymerizing a first resin segment and a second resin segment, separately, and reacting these segments with a bi-reactive monomer to bond the segments to each other.

Any one of the processes may be used in the present invention. Preferred is Process (2). Specifically, the following process is preferred: A polyvalent carboxylic acid and a polyhydric alcohol for forming the first resin segment, monomers for forming a second resin segment, and a bi-reactive monomer are mixed. A polymerization initiator is added to form a second resin segment through addition polymerization of the monomers for forming the second resin segment and the bi-reactive monomer. An esterification catalyst is then added to perform a polycondensation reaction.

In this process, the catalyst for synthesizing the first resin segment may be selected from a variety of known catalysts. Examples of the esterification catalyst include tin compounds, such as butyltin oxide and tin(II) 2-ethylhexanoate; and titanium compounds, such as titanium diisopropylate bis(triethanolaminate). Examples of the esterification cocatalyst include gallic acid (3,4,5-trihydroxybenzoic acid).

<Colorant>

The toner according to the present invention can contain colorants. The following known colorants may be used.

Examples of colorants contained in the yellow toner include C.I. Solvent Yellows 19, 44, 77, 79, 81, 82, 93, 98, 103, 104, 112, and 162, and C.I. Pigment Yellows 14, 17, 74, 93, 94, 138, 155, 180, and 185. These colorants may be used alone or in combination. Among these, particularly preferred is C.I. Pigment Yellow 74. The content of the colorant contained in the yellow toner is preferably 1 to 10 parts by mass, more preferably 2 to 8 parts by mass relative to 100 parts by mass of the binder resin.

Examples of the colorants contained in the magenta toner include C.I. Solvent Reds 1, 49, 52, 58, 63, 111, and 122, and C.I. Pigment Reds 5, 48:1, 53:1, 57:1, 122, 139, 144, 149, 166, 177, 178, and 222. These colorants may be used alone or in combination. Among these colorants, particularly preferred is C.I. Pigment Red 122. The content of the colorant contained in the magenta toner is preferably 1 to 10 parts by mass, more preferably 2 to 8 parts by mass relative to 100 parts by mass of the binder resin.

Examples of the colorant contained in the cyan toner include C.I. Pigment Blue 15:3.

The content of the colorant contained in the cyan toner is preferably 1 to 10 parts by mass, more preferably 2 to 8 parts by mass relative to 100 parts by mass of the binder resin.

Examples of the colorant contained in the black toner include carbon black, magnetic substances, and titanium black. Examples of carbon black include channel black, furnace black, acetylene black, thermal black, and lamp black. Examples of the magnetic substances include ferromagnetic metals, such as iron, nickel, and cobalt; alloys containing these ferromagnetic metals; compounds of ferromagnetic metals, such as ferrite and magnetite; and alloys containing no ferromagnetic metal and heat-treated to exhibit ferromagnetism. Examples of the alloys heat-treated to exhibit ferromagnetism include Heusler alloys, such as manganese-copper-aluminum and manganese-copper-tin; and chromium dioxide.

The content of the colorant contained in the black toner is preferably 1 to 10 parts by mass, more preferably 2 to 8 parts by mass relative to 100 parts by mass of the binder resin.

<Mold Releasing Agent>

The toner matrix particles according to the present invention can contain a mold releasing agent.

The mold releasing agent may be selected from a variety of known waxes. Examples of the waxes include polyolefin waxes, such as polyethylene wax and polypropylene wax; branched hydrocarbon waxes, such as microcrystalline wax; long-chain hydrocarbon waxes, such as paraffin wax and Sasol wax; dialkyl ketone waxes, such as distearyl ketone; ester waxes, such as carnauba wax, montan wax, behenyl behenate, trimethylolpropane tribehenate, pentaerythritol tetrabehenate, pentaerythritol diacetate dibehenate, glycerol tribehenate, 1,18-octadecanediol distearate, tristearyl trimellitate, and distearyl maleate; and amide waxes, such as ethylenediaminebehenylamide, and trimellitic tristearylamide.

The content of the mold releasing agent is preferably 0.1 to 30 parts by mass, more preferably 1 to 10 parts by mass relative to 100 parts by mass of the binder resin.

<Charge Controller>

The toner matrix particles according to the present invention can contain a charge controller when necessary.

The charge controller may be any substance which can impart positive or negative charge to toner by friction. A variety of known positive charge controllers and negative charge controllers may be used.

The content of the charge controller is preferably 0.01 to 30 parts by mass, more preferably 0.1 to 10 parts by mass relative to 100 parts by mass of the binder resin.

<Particle Diameter of Toner Matrix Particles>

The toner matrix particles forming the toner according to the present invention have a volume median particle diameter within the range of preferably 5.0 to 8.0 µm, particularly preferably 5.5 to 7.0 µm. Toner matrix particles having a particle diameter of 5.0 µm or more improve the transfer efficiency of the toner. Toner matrix particles having a particle diameter of 8.0 µm or less can increase the resolutions of latent images.

The volume median particle diameter of the toner matrix particle is measured and calculated with an analyzer "Multisizer 3" (available from Beckman Coulter, Inc.) connected to a computer system for data processing (available from Beckman Coulter, Inc.).

Specifically, a toner (0.02 g) is added to a surfactant solution (20 mL) (for example, a surfactant solution for dispersing toner matrix particles and prepared by 10-fold diluting a neutral detergent containing surfactant components with pure water), and is mixed. The solution is ultrasonically dispersed for one minute to prepare a dispersion of toner matrix particles. The dispersion of toner matrix particles is poured with a pipette into "ISOTONII" (available from Beckman Coulter, Inc.) in a beaker placed on a sample stand until the analyzer indicates a concentration of 5 to 10%. Control of the concentration within this range can provide experimental reproducibility. In the analyzer, the counts of particles to be measured are set at 25000 and the aperture diameter at 50 µm. The range of measurement from 1 to 30 µm is divided into 256 subranges to calculate the frequencies in the subranges. A 50% particle diameter from the maximum cumulative volume fraction is defined as a volume median particle diameter.

<Average Circularity of Toner Matrix Particles>

The toner matrix particles have an average circularity within the range of preferably 0.930 to 1.000, more preferably 0.950 to 0.995 to enhance the charging stability of the toner and the low-temperature fixing characteristics thereof.

Toner matrix particles having an average circularity within this range barely crush. Such prevention of crushing of the toner matrix particles can reduce contamination of frictional charging members, resulting in a toner having stable charging characteristics and forming images of higher quality.

The average circularity of the toner matrix particles can be measured with an analyzer FPIA-2100 (available from Sysmex Corporation).

Specifically, a sample (toner) is mixed with an aqueous solution containing a surfactant, and is ultrasonically dispersed for one minute. Subsequently, the dispersion is photographed with the analyzer FPIA-2100 (available from Sysmex Corporation) in a high power field (HPF) mode at an appropriate density (3000 to 10000 particles are detected at an HPF). This range of number of particles to be detected at an HPF can provide reproductivity in the measurement. From the photographed image of toner matrix particles, the circularities of the toner matrix particles are calculated from Expression (2). The circularities of the toner matrix particles are added, and the sum is divided by the total number of toner matrix particles to obtain the average circularity.

circularity of toner matrix particle=(perimeter of circle having projected area identical to that of projected image of particle)/(perimeter of projected image of particle)     Expression (2):

<Core-Shell Structure>

The toner matrix particles according to the present invention may have a multi-layer structure, such as a core-shell structure composed of a core particle, i.e., the toner matrix particle, and a shell layer coating the surface of the core particle. The shell layer does not need to completely coat the entire surface of the core base particle, and part of the core particle may be exposed. The cross-section of the core-shell structure can be observed with a known instrument, such as a transmission electron microscope (TEM) or a scanning probe microscope (SPM).

The core-shell structure can be formed of a core particle and a shell layer having characteristics (such as glass transition temperature, melting point, and hardness) different from each other. Such a core-shell structure enables design of the toner particles satisfying the purposes. For example, a resin having a relatively high glass transition temperature (Tg) is agglomerated, and is fused into a shell layer on the surfaces of core particles containing a binder resin, a colorant, and a mold releasing agent and having a relatively low glass transition temperature (Tg). The shell layer preferably contains an amorphous resin.

[Preparation of Toner for Developing Electrostatic Images]

The toner according to the present invention can be prepared by any process. Examples thereof include known processes, such as kneading pulverization, suspension polymerization, emulsion agglomeration, dissolution suspension, polyester extension, and dispersion polymerization. Among these processes, preferred is emulsion agglomeration because of uniformity of the particle diameter and controllability of the particle shape.

In emulsion agglomeration, toner particles are prepared as follows: A dispersion of particles of the binder resin (hereinafter, also referred to as "binder resin particles") dispersed with a surfactant or dispersion stabilizer is mixed with an optional dispersion of particles of the colorant (hereinafter, also referred to as "colorant particles"). These particles are agglomerated until the resulting toner particles have a desired diameter. The binder resin particles are further fused to control the shapes of the toner particles. In this process, the binder resin particles may appropriately contain a mold releasing agent and/or a charge controller.

One example of the process of preparing the toner according to the present invention will be described below, where toner particles having a core-shell structure are prepared by emulsion agglomeration. The process includes:

(1) A step of dispersing colorant particles in an aqueous medium to prepare a colorant particle dispersion;

(2) a step of dispersing binder resin particles containing an optional internal additive in an aqueous medium to prepare resin particle dispersions (resin particle dispersion for a core/resin particle dispersion for a shell);

(3) a step of mixing the colorant particle dispersion with the resin particle dispersion for a core to prepare a resin particle dispersion for agglomeration, and agglomerating and fusing the colorant particles and the binder resin particles in the presence of a coagulating agent to form agglomerated particles as core particles (agglomeration and fusion step);

(4) a step of adding a dispersion of resin particles for a shell containing binder resin particles for a shell layer in a dispersion containing core particles, and agglomerating and fusing the resin particles for a shell layer on the surfaces of the core particles to form toner matrix particles having a core-shell structure (agglomeration and fusion step);

(5) a step of separating the toner matrix particles from the dispersion of toner matrix particles (toner matrix particle dispersion) to remove the surfactant (washing step);

(6) a step of drying the toner matrix particles (drying step); and (7) a step of adding an external additive to the toner matrix particles (treatment step with external additive).

The toner particles having a core-shell structure can be prepared as follows: Binder resin particles for core particles and colorant particles are agglomerated and fused to prepare core particles. In the next step, binder resin particles for a shell layer are added to a dispersion of core particles, and binder resin particles for a shell layer are agglomerated and fused on the surfaces of the core particles to form a shell layer coating the surfaces of the core particles.

Although the process of preparing the toner matrix particles having a core-shell structure including a shell layer has been described, the shell layer is not always necessary.

The core particles may be formed into a multi-layer structure of two or more layers composed of binder resins having different compositions. For example, binder resin nanoparticles having a three-layer structure may be prepared through three stages of polymerization reaction of binder resins, i.e., first polymerization (formation of inner layer), second polymerization (formation of intermediate layer), and third polymerization (formation of outer layer). In this process, the composition of the polymerizable monomers in the polymerization reaction may be modified from first to third polymerization stages to prepare binder resin nanoparticles composed of three layers having different compositions. For example, a binder resin containing an appropriate internal additive, such as a mold releasing agent, may be polymerized at one of the first to third polymerization stages to form binder resin nanoparticles composed of three layers containing the appropriate internal additive.

<External Addition>

An external additive may be added to the toner matrix particles with a mechanical mixer. Examples of usable mechanical mixers include a Henschel mixer, a Nauti Mixer, and a turbular mixer. Among these mixers, a Henschel mixer, which can impart shear force to the particles, may be used to mix the particles for a longer mixing time or with a stirring blade at a higher circumferential rate of rotation. If several external additives are used, all the external additives may be mixed with the toner particles in batch, or aliquots of the external additives may be separately mixed with the toner particles.

In the mixing process of the external additive(s), the degree of disintegration of the external additive(s) and the adhering strength thereof can be controlled with the mechanical mixer, for example, through control of the mixing strength or the circumferential rate of the stirring blade, the mixing time, or the mixing temperature.

In the preparation of the toner according to the present invention, the degree of disintegration of the lanthanum-containing titanate compound as an external additive and the adhesion strength of the compound to the toner matrix particles can be controlled by the mechanical mixer and the mixing process.

<Two-Component Developer>

The toner according to the present invention can be mixed with the following carrier particles to prepare a two-component developer. The mixing may be performed with any mixer. Examples thereof include a Nauti Mixer, a double cone mixer, and a V-type mixer.

The toner can be contained in the two-component developer in any amount. The content (toner content) is preferably 4.0 to 8.0 mass %.

<Carrier Particles>

The carrier particles are composed of a magnetic substance. A known magnetic substance may be used. For example, the carrier particles may be resin-coated carrier particles composed of core particles of a magnetic substance coated with a resin, or dispersive carrier particles composed of magnetic nanoparticles dispersed in a resin. Preferred carrier particles are the resin-coated carrier particles to reduce the adhesion of the carrier particles to the photoreceptor. The resin-coated carrier particles will now be described.

(Core Particles)

Examples of materials for core particles forming the coated carrier particles include metal powders, such as iron power, and a variety of ferrites. Among these materials, preferred are ferrites.

Preferred ferrites contain heavy metals, such as copper, zinc, nickel, or manganese, or contain light metals, such as alkali metals or alkaline earth metals.

Ferrite is represented by Formula (a), where the molar ratio y of $Fe_2O_3$ in ferrite is preferably within the range of 30 to 95 mol %.

$$(MO)_x(Fe_2O_3)_y \qquad \text{Formula (a):}$$

A ferrite having a molar ratio y within this range facilitates desired magnetization, and can prevent adhesion of the carrier particles to the photoreceptor.

In Formula (a), M represents a metal atom of manganese (Mn), magnesium (Mg), strontium (Sr), calcium (Ca), titanium (Ti), copper (Cu), zinc (Zn), nickel (Ni), aluminum (Al), silicon (Si), zirconium (Zr), bismuth (Bi), cobalt (Co), or lithium (Li). These metal atoms may be used alone or in combination.

The core particles forming the carrier particles preferably have a saturation magnetization within the range of 30 to 75 $A·m^2/kg$ and a residual magnetization of 5.0 $A·m^2/kg$ or less.

Use of core particles having such magnetic characteristics can prevent partial agglomeration of the carrier particles, and the two-component developer is uniformly applied onto the surface of the developer conveying member. As a result, uniform toner images with high definition can be formed without uneven toner density.

(Carrier-Coating Resin)

A highly hydrophobic alicyclic methacrylate used as a monomer for the coating resin contained in the resin-coated carrier particles reduces the moisture adsorption by the carrier particles, and thus variations in charging characteristics of the toner between different environments. Such an alicyclic methacrylate prevents a reduction in charge amount under an environment at a high temperature and a high humidity in particular. The resin prepared through polymerization of a monomer containing the alicyclic methacrylate has appropriate mechanical strength. The resin used as a coating material for the carrier particles is appropriately worn away to refresh the surfaces of the carrier particles.

Preferred alicyclic methacrylate has a cycloalkyl group having 5 to 8 carbon atoms. Specific examples thereof include cyclopentyl methacrylate, cyclohexyl methacrylate, cycloheptyl methacrylate, and cyclooctyl methacrylate. Among these alicyclic methacrylates, particularly preferred is cyclohexyl methacrylate in view of the mechanical strength of the carrier particles and the environmental stability of the charge amount of the toner.

The average thickness of the coating resin layer disposed on the carrier particles is preferably within the range of 0.05 to 4.0 μm, more preferably 0.2 to 3.0 μm in view of the compatibility between the durability of the carrier and the low electric resistance of the carrier. A coating material having an average layer within this range can control the charging characteristics of the carrier and the durability thereof within preferred ranges.

EXAMPLES

The embodiment will now be described in further detail by way of Examples, but these Examples should not be construed as a limitation to the present embodiment.

<Preparation of Toner Matrix Particles [b1]>

1. Preparation of Resin Particle Dispersion [A]

(1) First Polymerization

A surfactant solution of sodium dodecyl sulfate (8 parts by mass) in deionized water (3000 parts by mass) was placed in a reaction vessel provided with a stirrer, a temperature sensor, a cooling tube, and a nitrogen inlet. The vessel was heated to an inner temperature of 80° C. while the solution was being stirred at a stirring rate of 230 rpm under a nitrogen stream. After the heating, a solution of potassium persulfate (KPS) (10 parts by mass) in deionized water (200 parts by mass) was added to the surfactant solution, and the solution temperature was again controlled to 80° C. A polymerizable monomer mixed solution containing the following compounds was added dropwise to the solution over one hour:

Styrene: 480 parts by mass
n-Butyl acrylate: 250 parts by mass
Methacrylic acid: 68 parts by mass
n-Octyl 3-mercaptopropionate: 16 parts by mass After the addition of the polymerizable monomer mixed solution, the system was heated with stirring at 80° C. over two hours to perform polymerization (first polymerization). "Resin particle dispersion [1H]" containing "Resin particles [1h]" was thereby prepared.

(2) Second Polymerization

The following compounds were placed into a flask provided with a stirrer, and were dissolved at 90° C. to prepare a mixed solution of polymerizable monomers and a mold releasing agent:

Styrene: 245 parts by mass
n-Butyl acrylate: 120 parts by mass
n-Octyl 3-mercaptopropionate: 1.5 parts by mass
Paraffin wax "HNP-11 (available from NIPPON SEIRO CO., LTD.)": 67 parts by mass A surfactant solution of sodium polyoxyethylene-2-dodecyl ether sulfate (7 parts by mass) in deionized water (800 parts by mass) was heated to 98° C. Resin particle dispersion [1H] containing "Resin particles [1h]" (solid content: 260 parts by mass) and the mixed solution of the polymerizable monomers and the mold releasing agent were added to the surfactant solution. The resulting solution was agitated for one hour with a mechanical dispersing machine "Cleamix" (available from M Technique Co., Ltd.) having a circulation path to prepare a dispersion containing emulsified particles.

In the next step, a solution of potassium persulfate (6 parts by mass) in deionized water (200 parts by mass) was added to the dispersion. The system was heated with stirring at 82° C. over one hour to perform polymerization (second polymerization). "Resin particle dispersion [1HM]" containing "Resin particles [1hm]" was thereby prepared.

(3) Third Polymerization

An initiator solution of potassium persulfate (11 parts by mass) in deionized water (400 parts by mass) was added to "Resin particle dispersion [1HM]". The solution temperature was controlled to 80° C., and a polymerizable monomer mixed solution containing the following compounds was added dropwise to the initiator solution over one hour:

Styrene: 435 parts by mass
n-Butyl acrylate: 130 parts by mass
Methacrylic acid: 33 parts by mass
n-Octyl 3-mercaptopropionate: 8 parts by mass After the addition of the polymerizable monomer mixed solution, the system was heated with stirring over two hours to perform polymerization (third polymerization). The system was cooled to 28° C. to prepare "Resin particle dispersion [A]" containing "Resin particles [a]". The particle diameter of "Resin particles [a]" contained in "Resin particle dispersion [A]" was measured with an electrophoretic light scattering photometer "ELS-800 (available from Otsuka Electronics Co., Ltd.)". The volume median particle diameter was 150 nm. The glass transition temperature measured by a known process was 45° C. The resin forming Resin particles [a] had a weight average molecular weight of 32000.

2. Preparation of Colorant Particle Dispersion [1]

While a solution of sodium dodecyl sulfate (90 parts by mass) in deionized water (1600 parts by mass) was being stirred, C.I. Pigment Blue 15:3 (available from Toyo Ink Co., Ltd.) (420 parts by mass) was gradually added. In the next step, the colorant was dispersed with a stirrer "Cleamix (available from M Technique Co., Ltd.)" to prepare "Colorant particle dispersion [1]".

3. Preparation of Toner Matrix Particles [b1]

The following compounds were placed into a reaction vessel provided with a stirrer, a temperature sensor, a cooling tube, and a nitrogen inlet.

Resin particle dispersion [A]: 300 parts by mass (solid content)
Deionized water: 1400 parts by mass
Colorant particle dispersion [1]: 120 parts by mass (solid content)

In the next step, a solution of sodium polyoxyethylene-2-dodecyl sulfate (3 parts by mass) in deionized water (120 parts by mass) was placed into the reaction vessel, and the solution temperature was controlled to 30° C. A 5 mol/liter aqueous sodium hydroxide solution was added to the system to adjust the pH to 10.

An aqueous solution of magnesium chloride hexahydrate (35 parts by mass) in deionized water (35 parts by mass) was then added to the system under stirring at 30° C. over ten minutes. The system was kept at this temperature for three minutes, and was heated to 90° C. over 60 minutes. The particles were agglomerated and fused in the state where the temperature was kept at 90° C. In this state, the diameters of the particles growing in the reaction vessel were measured with "Multisizer 3 (available from Beckman Coulter, Inc.)". When the volume median particle diameter reached 6.5 μm, an aqueous solution of sodium chloride (150 parts by mass) in deionized water (600 parts by mass) was added to terminate the growth of the particles. The particles were further aged through stirring at a solution temperature of 98°

C. to fuse the particles until the average circularity measured with an analyzer "FPIA-2100 (available from Sysmex Corporation)" reached 0.965.

The solution temperature was then lowered to 30° C., and the pH of the solution was adjusted to 2 with hydrochloric acid. The stirring was then stopped. "Toner matrix particle dispersion [B1]" was thereby prepared.

"Toner matrix particle dispersion [B1]" prepared through the steps was subjected to solid liquid separation with a basket type centrifuge "MARKIII No. 60×40 (available from Matsumoto Machine Sales Co., Ltd.)" to extract a wet cake of "Toner matrix particles [b]".

The wet cake was washed with deionized water at 45° C. in the basket type centrifuge until the electric conductivity of the filtrate reached 5 μS/cm. The wet cake was then placed into a "flash jet dryer (available from Seishin Enterprise Co., Ltd.)", and was dried until the moisture content reached 0.5 mass %. "Toner matrix particles [b1]" of cyan color was thereby prepared.

<Preparation of Toner Matrix Particles [b2]>

1. Preparation of Mold Releasing Agent Dispersion [1]

Paraffin wax (melting point: 73° C., 50 parts by mass), sodium n-dodecyl sulfate (2 parts by mass), and deionized water (200 parts by mass) were added, and were heated to 120° C. The materials were dispersed with mixing with a mixer ULTRA-TURRAX T50 available from IKA Works GmbH & Co. KG and then were dispersed with a pressurizing ejection homogenizer to prepare Mold releasing agent dispersion [1] having a volume average particle diameter of 200 nm and a solid content of 20%.

2. Preparation of Amorphous Polyester Resin Nanoparticle Dispersion [1]

(1) Synthesis of Amorphous Polyester Resin

Ten aliquots of bisphenol A propylene oxide 2 mol adduct (360 parts by mass), terephthalic acid (80 parts by mass), fumaric acid (55 parts by mass), and a polycondensation catalyst titanium tetraisopropoxide (2 parts by mass) were placed into a reaction tank provided with a cooling tube, a stirrer, and a nitrogen inlet pipe, and were reacted for ten hours at 200° C. under a nitrogen stream while the generated water was being distilled off. These materials were then reacted under a reduced pressure of 13.3 kPa (100 mmHg). When the softening point reached 104° C., the product was extracted. An amorphous polyester resin was thereby synthesized.

(2) Preparation of Amorphous Polyester Resin Particle Dispersion [1]

The polyester resin (100 parts by mass) was pulverized with a grinding machine "Roundel Mill type: RM" (available from TOKUJU CORPORATION), and was mixed with a solution (638 parts by mass) of 0.26 mass % sodium lauryl sulfate preliminarily prepared. While being stirred, the polyester resin was ultrasonically dispersed with an ultrasonic homogenizer "US-150T" (available from NIHONSEIKI KAISHA LTD.) at V-LEVEL and 300 μA for 30 minutes to prepare Amorphous polyester resin nanoparticle dispersion [1] having a volume median particle diameter of 250 nm.

3. Preparation of Crystalline Polyester Resin Nanoparticle Dispersion [1]

(1) Synthesis of Crystalline Polyester Resin

Ten aliquots of 1,6-hexanediol (118 parts by mass), tetradecanedioic acid (271 parts by mass), and a polycondensation catalyst titanium tetraisopropoxide (0.8 parts by mass) were separately placed into a reaction tank provided with a cooling tube, a stirrer, and a nitrogen inlet pipe, and were reacted for five hours at 235° C. under a nitrogen stream while the generated water was being distilled off. The materials were then reacted under a reduced pressure of 13.3 kPa (100 mmHg) for one hour to synthesize a crystalline polyester resin.

(2) Preparation of Crystalline Polyester Resin Particle Dispersion [1]

The polyester resin (100 parts by mass) was pulverized with a grinding machine "Roundel Mill type RM" (available from TOKUJU CORPORATION), and was mixed with a solution (638 parts by mass) of 0.26 mass % sodium lauryl sulfate preliminarily prepared. While being stirred, the polyester resin was ultrasonically dispersed with an ultrasonic homogenizer "US-150T" (available from NIHONSEIKI KAISHA LTD.) at V-LEVEL and 300 μA for 30 minutes to prepare Crystalline polyester resin nanoparticle dispersion [1] having a volume median particle diameter of 200 nm.

4. Preparation of Toner Matrix Particles [b2]

Amorphous polyester resin nanoparticle dispersion [1] (solid content: 250 parts by mass), Crystalline polyester resin nanoparticle dispersion [1] (solid content: 50 parts by mass), Mold releasing agent dispersion [1](solid content: 25 parts by mass), and deionized water (2000 parts by mass) were placed into a reaction vessel provided with a stirrer, a temperature sensor, and a cooling tube, and a 5 mol/liter aqueous sodium hydroxide solution was added at 30° C. to adjust the pH to 10. Colorant particle dispersion [1] (solid content: 40 parts by mass) was then added. In the next step, an aqueous solution of magnesium chloride (60 parts by mass) in deionized water (60 parts by mass) was added under stirring at 30° C. over ten minutes. The system was left for three minutes, and the heating of the system was started. The system was heated at 80° C. over 60 minutes, and a particle growth reaction was continued while the system was kept at 80° C. In this state, the diameters of associated particles were measured with "Multisizer 3" (available from Beckman Coulter, Inc.). When the volume median particle diameter reached 6.5 μm, an aqueous solution of sodium chloride (190 parts by mass) in deionized water (760 parts by mass) was added to terminate the growth of the particles. The particles were further heated with stirring at 90° C. to fuse the particles. The particles were cooled to 30° C. when the average circularity of the toner measured with an analyzer "FPIA-2100" (available from Sysmex Corporation) (4000 particles detected at an HPF) reached 0.955. Toner matrix particle dispersion [B2] was thereby prepared.

Toner matrix particle dispersion [B2] was subjected to solid liquid separation with a centrifuge to extract a wet cake of Toner matrix particles [b2]. The wet cake was washed with deionized water at 35° C. in the centrifuge until the electric conductivity of the filtrate reached 5 μS/cm. The wet cake was placed into a "flash jet dryer" (available from Seishin Enterprise Co., Ltd.), and was dried until the moisture content reached 0.5 mass %. Toner matrix particles [b2] were thereby prepared.

<Preparation of Toner Matrix Particles [b3]>

Toner matrix particles [b3] were prepared as in the preparation of Toner matrix particles [b2] except that Amorphous polyester resin nanoparticle dispersion [1] was replaced with Vinyl-modified amorphous polyester resin nanoparticle dispersion [2] prepared as described below and Crystalline polyester resin nanoparticle dispersion [1] was replaced with Vinyl-modified crystalline polyester resin nanoparticle dispersion [2] prepared as follows.

1. Preparation of Vinyl-Modified Amorphous Polyester Resin Nanoparticle Dispersion [2]

(1) Synthesis of Vinyl-Modified Amorphous Polyester Resin

The following materials were placed into a 10-liter four-necked flask provided with a nitrogen inlet pipe, a dehydration tube, a stirrer, and a thermocouple:

Bisphenol A propylene oxide 2 mol adduct: 480 parts by mass
Terephthalic acid: 130 parts by mass
Fumaric acid: 85 parts by mass
Esterification catalyst (tin octylate): 2 parts by mass.

These materials were subjected to a condensation polymerization reaction at 230° C. for eight hours, and were further reacted under 8 kPa for one hour. The system was cooled to 160° C., and a mixture of acrylic acid (8.6 parts by mass), styrene (131 parts by mass), butyl acrylate (30 parts by mass), and a polymerization initiator (di-t-butyl peroxide) (10 parts by mass) was added dropwise through a dropping funnel over one hour. After the addition, an addition polymerization reaction was continued for one hour while the system was kept at 160° C. The system was heated to 200° C., and was kept under 10 kPa for one hour. Acrylic acid, styrene, and butyl acrylate were removed to prepare a vinyl-modified crystalline polyester resin.

(2) Preparation of Vinyl-Modified Amorphous Polyester Resin Nanoparticle Dispersion [2]

The vinyl-modified polyester resin (100 parts by mass) was pulverized with a grinding machine "Roundel Mill type RM" (available from TOKUJU CORPORATION), and was mixed with a solution (638 parts by mass) of 0.26 mass % sodium lauryl sulfate preliminarily prepared. While being stirred, the vinyl-modified polyester resin was ultrasonically dispersed with an ultrasonic homogenizer "US-150T" (available from NIHONSEIKI KAISHA LTD.) at V-LEVEL and 300 μA for 30 minutes to prepare Vinyl-modified amorphous polyester resin nanoparticle dispersion [2] having a volume median particle diameter of 170 nm.

2. Preparation of Vinyl-Modified Crystalline Polyester Resin Nanoparticle Dispersion [2]

(1) Synthesis of Vinyl-Modified Amorphous Polyester Resin

The following materials were placed into a 10-liter four-necked flask provided with a nitrogen inlet pipe, a dehydration tube, a stirrer, and a thermocouple:

Tetradecanedioic acid: 271 parts by mass
1,6-Hexanediol: 118 parts by mass
Titanium tetraisopropoxide: 0.8 parts by mass These materials were subjected to a condensation polymerization reaction at 230° C. for eight hours, and were further reacted under 8 kPa for one hour. The system was cooled to 160° C., and a mixture of acrylic acid (8.6 parts by mass), styrene (131 parts by mass), butyl acrylate (30 parts by mass), and a polymerization initiator (di-t-butyl peroxide) (10 parts by mass) was added dropwise through a dropping funnel over one hour. After the addition, the addition polymerization reaction was continued for one hour in the system kept at 160° C. The system was heated to 200° C., and was kept under 10 kPa for one hour. Acrylic acid, styrene, and butyl acrylate were removed to prepare a vinyl-modified polyester resin.

(2) Preparation of Vinyl-Modified Crystalline Polyester Resin Nanoparticle Dispersion [2]

The vinyl-modified crystalline polyester resin (100 parts by mass) was pulverized with a grinding machine "Roundel Mill type RM" (available from TOKUJU CORPORATION), and was mixed with a solution (638 parts by mass) of 0.26 mass % sodium lauryl sulfate. The vinyl-modified crystalline polyester resin was ultrasonically dispersed with stirring in an ultrasonic homogenizer "US-150T" (available from NIHONSEIKI KAISHA LTD.) at V-LEVEL and 300 μA for 30 minutes to prepare Vinyl-modified crystalline polyester resin nanoparticle dispersion [2] having a volume median particle diameter of 170 nm.

<Preparation of External Additive>

1. Preparation of Lanthanum-Containing Strontium Titanate Particles [s1]

Metatitanic acid yielded by a sulfuric acid process was subjected to deironization bleaching. An aqueous sodium hydroxide solution was added to adjust the pH to 9.0, and desulphurization was performed. The product was then neutralized to a pH of 5.8 with hydrochloric acid, and was washed with water after filtration. Water was added to the washed cake into a slurry containing 1.85 mol/L of $TiO_2$. Hydrochloric acid was added to adjust the pH to 1.0, and the slurry was deflocculated. The metatitanic acid (0.625 mol of $TiO_2$) was collected, and was placed into a 3-L reaction vessel. An aqueous strontium chloride solution and an aqueous lanthanum chloride solution (0.719 mol in total) were added into the reaction vessel such that the molar ratio $[Sr^{2+}:La^{3+}:Ti^{4+}]$ was 1.00:0.18:1.00. The concentration of $TiO_2$ was adjusted to 0.313 mol/L. In the next step, these materials were heated with stirring to 90° C., and an aqueous solution (296 mL) of 5 N sodium hydroxide was added over 26 hours. The stirring was continued at 95° C. for one hour, and the reaction was terminated.

The reaction slurry was cooled to 50° C., and hydrochloric acid was added such that the pH reached 5.0. The stirring was continued for one hour.

The precipitate was washed through decantation, and hydrochloric acid was added to the slurry containing the precipitate to adjust the pH to 6.5. Isobutyltrimethoxysilane was added in an amount of 9 mass % relative to the solid content, and the stirring was continued for one hour.

In the next step, the slurry was washed through filtration. The extracted cake was dried in the air at 120° C. for eight hours to yield Lanthanum-containing strontium titanate particles (s1). The particles were observed with an electron microscope. The particles had a primary particle diameter of 160 to 200 nm. The number average primary particle diameter calculated in terms of mass using an electron microscope photograph was 180 nm. The average circularity was 0.85.

2. Preparation of Lanthanum-Containing Strontium Titanate Particles [s2] to [s11]

Lanthanum-containing strontium titanate particles [s2] to [s11] were prepared as in Lanthanum-containing strontium titanate particles [s1] except that the molar ratio $[Sr^{2+}:La^{3+}:Ti^{4+}]$ in the addition of the aqueous strontium chloride solution and the aqueous lanthanum chloride solution and the time to add the aqueous solution (296 mL) of 5 N sodium hydroxide were varied as shown in Table I.

TABLE I

| Lanthanum-containing strontium titanate particles | Molar ratio $[Sr^{2+}:La^{3+}:Ti^{4+}]$ | *1 [hour] | Number average primary particle diameter [nm] | Average circularity |
|---|---|---|---|---|
| s1 | 1.00:0.18:1.00 | 26 | 180 | 0.85 |
| s2 | 1.00:0.18:1.00 | 20 | 110 | 0.85 |
| s3 | 1.00:0.18:1.00 | 18 | 100 | 0.85 |
| s4 | 1.00:0.18:1.00 | 10 | 30 | 0.85 |
| s5 | 1.00:0.18:1.00 | 5 | 10 | 0.85 |
| s6 | 1.00:0.18:1.00 | 4 | 8 | 0.85 |
| s7 | 1.00:0.07:1.00 | 10 | 30 | 0.82 |
| s8 | 1.00:0.06:1.00 | 10 | 30 | 0.80 |
| s9 | 1.00:0.05:1.00 | 10 | 30 | 0.79 |
| s10 | 1.00:0.35:1.00 | 10 | 30 | 0.90 |
| s11 | 1.00:0.38:1.00 | 10 | 30 | 0.92 |

*1: Time of addition of aqueous solution (296 mL) of 5N sodium hydroxide

3. Preparation of Lanthanum-Containing Calcium Titanate Particles [c1]

Lanthanum-containing Calcium titanate particles [c1] were prepared as in Lanthanum-containing strontium titanate particles [s4] except that the aqueous strontium chloride solution was replaced with an aqueous calcium chloride solution, and was added such that the molar ratio [$Ca^{2+}$:$La^{3+}$:$Ti^{4+}$] was 1.00:0.18:1.00. The particles were observed with an electron microscope. The particles had a primary particle diameter of 26 to 33 nm. The number average primary particle diameter calculated in terms of mass using an electron microscope photograph was 30 nm. The average circularity was 0.85.

4. Preparation of Lanthanum-Containing Magnesium Titanate Particles [m1]

Lanthanum-containing magnesium titanate particles [m1] were prepared as in Lanthanum-containing strontium titanate particles [s4] except that the aqueous strontium chloride solution was replaced with an aqueous magnesium chloride solution, and was added such that the molar ratio [$Mg^{2+}$:$La^{3+}$:$Ti^{4+}$] was 1.00:0.18:1.00. The particles were observed with an electron microscope. The particles had a primary particle diameter of 25 to 34 nm. The number average primary particle diameter calculated in terms of mass using an electron microscope photograph was 30 nm. The average circularity was 0.85.

5. Preparation of Strontium Titanate Particles [ns1]

Strontium titanate particles [ns1] were prepared as in Lanthanum-containing strontium titanate particles [s4] such that the molar ratio [$Sr^{2+}$:$La^{3+}$:$Ti^{4+}$] was 1.00:0:1.00. The particles were observed with an electron microscope. The particles had a primary particle diameter of 26 to 33 nm. The number average primary particle diameter calculated in terms of mass using an electron microscope photograph was 30 nm. The average circularity was 0.75.

6. Preparation of Calcium Titanate Particles [nc1]

Strontium titanate particles [nc1] were prepared as in Lanthanum-containing Calcium titanate particles [c1] such that the molar ratio [$Ca^{2+}$:$La^{3+}$:$Ti^{4+}$] was 1.00:0:1.00. The particles were observed with an electron microscope. The particles had a primary particle diameter of 26 to 33 nm. The number average primary particle diameter calculated in terms of mass using an electron microscope photograph was 30 nm. The average circularity was 0.75.

<Preparation of Toner [1]>

Toner matrix particles [b1] and Lanthanum-containing strontium titanate [s4] were placed into a Henschel mixer "FM20C/I" (available from NIPPON COKE & ENGINEERING CO., LTD.) such that the content of the lanthanum-containing titanate compound was 0.5 mass % and the content of hydrophobic silica (HMDS-treated, degree of hydrophobizing: 72%, number average primary particle diameter: 20 nm) was 0.5 mass % relative to the total amount of toner. External addition of these materials was then performed with stirring for 15 minutes at the number of rotations set such that the blade distal end had a circumferential rate of 40 m/s. "Toner [1]" was thereby prepared.

The temperature for external addition was set within the range of 39 to 41° C. Specifically, the inner temperature of the Henschel mixer was controlled as follows: Cooling water was fed at a flow rate of 5 L/min through the outer bath of the Henschel mixer when the inner temperature of the Henschel mixer reached 41° C., and cooling water was fed at a flow rate of 1 L/min through the outer bath of the Henschel mixer when the inner temperature reached 39° C.

As a result of the measurement, the average adhesion strength of Lanthanum-containing strontium titanate [s4] to Toner matrix particles [b1] was 70%.

(Measurement of Average Adhesion Strength)

A toner (3 g) was wetted with an aqueous solution (40 g) of 0.2 mass % polyoxyethyl phenyl ether in a 100 mL plastic cup. In an ultrasonic homogenizer "US-1200" (available from NIHONSEIKI KAISHA LTD.), ultrasonic energy was adjusted such that the ammeter attached to the ultrasonic homogenizer indicated 60 μA (50 W), and was applied for three minutes to ultrasonically disperse the toner. In the next step, the toner was separated with a filter having an opening of 1 μm, was washed with 60 mL of pure water, and was dried.

The amount of residual titanium atom in the sample after drying (hereinafter, referred to as sample A) was measured with a wavelength dispersive X-ray fluorescence analyzer "XRF-1700" (available from SHIMADZU Corporation).

In a specific measurement process, the dried sample A (2 g) was pelletized under pressure. The pellets were measured by qualitative analysis under the following conditions. In the measurement, the Kα peak angle of the target element was determined from a 2θ table.

Conditions of Spectrometer

Slit: standard

Attenuator: none

Dispersive crystal: LiF

Detector: SC

A sample (hereinafter, referred to as sample B) was prepared from toner (3 g) as in the sample A except that the toner was not ultrasonically dispersed, and the amount of titanium atoms in the sample B was also measured.

The net intensity of the Kα ray of Ti in the sample A was divided by the net intensity of the Kα of Ti in the sample B to calculate the residual Ti rate. The residual Ti rate was defined as the average adhesion strength.

<Preparation of Toners [2] to [26]>

Toners [2] to [26] were prepared as in Toner [1] except that the types of toner matrix particles, the types of titanate compound, the content of the lanthanum-containing titanate compound (or titanate compound without lanthanum) relative to the total amount of toner, the content of titanium dioxide relative to the total amount of toner, and the time to stir the external additive were varied as shown in Table II below.

In the preparation of Toners [22], [23], and [26], titanium dioxide (HMDS-treated, degree of hydrophobizing: 55%, number average primary particle diameter: 20 nm) was added in accordance with the content of titanium dioxide shown in Table II.

In Table II, [–] indicates that the lanthanum-containing titanate compound (or titanate compound without lanthanum) was not added in the preparation of Toner [26].

In the toners, the average adhesion strength was measured as in Toner [1]. The results are shown in Table II below.

TABLE II

| | | | Lanthanum-containing titanate compound (or lanthanum-free titanate compound) | | | | |
|---|---|---|---|---|---|---|---|
| Toner | Toner matrix particles | No. | Compound | *1 [mass %] | Number average primary particle diameter [nm] | Average circularity | *2 [mass %] |
| 1 | b1 | s4 | Lanthanum-containing strontium titanate | 8.3 | 30 | 0.85 | 0.6 |
| 2 | b2 | s4 | Lanthanum-containing strontium titanate | 8.3 | 30 | 0.85 | 0.6 |

TABLE II-continued

| | | | | | | | |
|---|---|---|---|---|---|---|---|
| 3 | b3 | s4 | Lanthanum-containing strontium titanate | 8.3 | 30 | 0.85 | 0.6 |
| 4 | b1 | s6 | Lanthanum-containing strontium titanate | 8.3 | 8 | 0.85 | 0.6 |
| 5 | b1 | s2 | Lanthanum-containing strontium titanate | 8.3 | 110 | 0.85 | 0.6 |
| 6 | b1 | s1 | Lanthanum-containing strontium titanate | 8.3 | 180 | 0.85 | 0.6 |
| 7 | b1 | s5 | Lanthanum-containing strontium titanate | 8.3 | 10 | 0.85 | 0.6 |
| 8 | b1 | s3 | Lanthanum-containing strontium titanate | 8.3 | 100 | 0.85 | 0.6 |
| 9 | b1 | s8 | Lanthanum-containing strontium titanate | 2.9 | 30 | 0.80 | 0.6 |
| 10 | b1 | s4 | Lanthanum-containing strontium titanate | 8.3 | 30 | 0.85 | 0.6 |
| 11 | b1 | s4 | Lanthanum-containing strontium titanate | 8.3 | 30 | 0.85 | 0.6 |
| 12 | b1 | s7 | Lanthanum-containing strontium titanate | 3.4 | 30 | 0.82 | 0.6 |
| 13 | b1 | s9 | Lanthanum-containing strontium titanate | 2.4 | 30 | 0.79 | 0.6 |
| 14 | b1 | s10 | Lanthanum-containing strontium titanate | 14.9 | 30 | 0.90 | 0.6 |
| 15 | b1 | s11 | Lanthanum-containing strontium titanate | 16.0 | 30 | 0.92 | 0.6 |
| 16 | b1 | c1 | Lanthanum-containing calcium titanate | 8.3 | 30 | 0.85 | 0.6 |
| 17 | b1 | m1 | Lanthanum-containing magnesium titanate | 8.3 | 30 | 0.85 | 0.6 |
| 18 | b1 | s4 | Lanthanum-containing strontium titanate | 8.3 | 30 | 0.85 | 0.1 |
| 19 | b1 | s4 | Lanthanum-containing strontium titanate | 8.3 | 30 | 0.85 | 0.09 |
| 20 | b1 | s4 | Lanthanum-containing strontium titanate | 8.3 | 30 | 0.85 | 1.0 |
| 21 | b1 | s4 | Lanthanum-containing strontium titanate | 8.3 | 30 | 0.85 | 1.1 |
| 22 | b1 | s4 | Lanthanum-containing strontium titanate | 8.3 | 30 | 0.85 | 0.6 |
| 23 | b1 | s4 | Lanthanum-containing strontium titanate | 8.3 | 30 | 0.85 | 0.6 |
| 24 | b1 | ns1 | Strontium titanate | — | 30 | 0.75 | 0.6 |
| 25 | b1 | nc1 | Calcium titanate | — | 30 | 0.75 | 0.6 |
| 26 | b1 | — | — | — | — | — | — |

| Toner | *3 [mass %] | Time of stirring of external additive [min] | Average adhesion strength [%] | Notes |
|---|---|---|---|---|
| 1 | 0 | 15 | 70 | Example |
| 2 | 0 | 15 | 70 | Example |
| 3 | 0 | 15 | 70 | Example |
| 4 | 0 | 15 | 70 | Example |
| 5 | 0 | 15 | 70 | Example |
| 6 | 0 | 15 | 70 | Example |
| 7 | 0 | 15 | 70 | Example |
| 8 | 0 | 15 | 70 | Example |
| 9 | 0 | 15 | 70 | Example |
| 10 | 0 | 7 | 50 | Example |
| 11 | 0 | 5 | 45 | Example |
| 12 | 0 | 15 | 70 | Example |
| 13 | 0 | 15 | 70 | Example |
| 14 | 0 | 15 | 70 | Example |
| 15 | 0 | 15 | 70 | Example |
| 16 | 0 | 15 | 70 | Example |
| 17 | 0 | 15 | 70 | Example |
| 18 | 0 | 15 | 70 | Example |
| 19 | 0 | 15 | 70 | Example |
| 20 | 0 | 15 | 70 | Example |
| 21 | 0 | 15 | 70 | Example |
| 22 | 0.09 | 15 | 70 | Example |
| 23 | 0.20 | 15 | 70 | Example |
| 24 | 0 | 15 | 70 | Comparative Example |
| 25 | 0 | 15 | 70 | Comparative Example |
| 26 | 0.50 | 15 | 70 | Comparative Example |

*1: Lanthanum content in lanthanum-containing titanate compound
*2: Content of titanate compound relative to total amount of toner
*3: Content of titanium dioxide relative to total amount of toner <Preparation of Two-Component Developers [D1] to [D26]>

The carrier particles prepared were ferrite carrier coated with a copolymerization resin (monomer mass ratio=1:1) of cyclohexyl methacrylate and methyl methacrylate and having a volume average particle diameter of 30 μm.

In the next step, the ferrite carrier (100 parts by mass) was mixed with each of Toners [1] to [26] (6 parts by mass) to prepare Two-component developers [D1] to [D26]. These materials were mixed with a V blender (number of rotations: 20 rpm, stirring time: 20 minutes) under an environment at normal temperature and normal humidity (temperature: 20° C., relative humidity: 50% RH). Two-component developers [D1] to [D26] were used after sieving with a mesh having an opening of 125 μm.

Two-component developers [D1] to [D26] were used in evaluations of image stripes, scattering of toner, and fogging described later.

<Preparation of Two-Component Developers [$D_L1$] to [$D_L26$]>

Two-component developers [$D_L1$] to [$D_L26$] were prepared as in Two-component developers [D1] to [D26] except that the ferrite carrier and the toner were mixed under an environment at normal temperature and normal humidity (temperature: 10° C., relative humidity: 20% RH).

Two-component developers [$D_L1$] to [$D_L26$] were used in evolution of the average charge amount described later.

<Preparation of Two-Component Developers [$D_H1$] to [$D_H26$]>

Two-component developers [$D_H1$] to [$D_H26$] were prepared as in Two-component developers [D1] to [D26] except that the ferrite carrier and the toner were mixed under an environment at normal temperature and normal humidity (temperature: 30° C., relative humidity: 80% RH).

Two-component developers [$D_H1$] to [$D_H26$] were used in evaluation of the average charge amount described later.

<Evaluations>

(1) Evaluation of Average Charge Amount

The average charge amount of two-component developers [$D_L1$] to [$D_L26$] and Two-component developers [$D_H1$] to [$D_H26$] was measured by the following process. The average charge amount was measured at the same temperature and relative humidity as those when the ferrite carrier was mixed with the toner.

The average charge amount was measured with an average charge amount analyzer 60 illustrated in FIG. 1. A two-component developer (1 g) weighed with a precision balance was uniformly placed across the entire surface of a conductive sleeve 61. A voltage of 2 kV was fed from a bias power supply 63 to the conductive sleeve 61. The number of rotations of a magnet roll 62 disposed within the conductive sleeve 61 was set at 1000 rpm. The two-component developer was left under this condition for 30 seconds, and was collected on a cylindrical electrode 64. The potential Vm of the cylindrical electrode 64 was read after 30 seconds, and the charge amount of the two-component developer was determined. The mass of the collected two-component developer was measured with the precision balance to determine the average charge amount (−μC/g).

The difference in average charge amount between different environments (μC/g) was calculated from the absolute difference between the average charge amount of each of Two-component developer [$D_L1$] to [$D_L26$] and the average charge amount of each of Two-component developers [$D_H1$] to [$D_H26$]. The difference in average charge amount between different environments was evaluated according to the following criteria. In the present invention, the rank A or B was determined to be acceptable. The results of evaluation are show in Table III.

A: The difference in average charge amount between different environments is less than 5.0 μC/g.

B: The difference in average charge amount between different environments is within the range of 5.0 to 20.0 μC/g.

D: The difference in average charge amount between different environments is more than 20.0 μC/g.

(2) Evaluation of Image Stripes

Two-component developers [D1] to [D26] were charged in sequence into the cyan developing unit in an imaging apparatus "bizhub PRESS C1070" (available from KONICA MINOLTA, INC.), and were evaluated.

A durability test was performed under an environment at a temperature of 23° C. and a humidity of 50% RH. A band image having an image area ratio of 5% was continuously printed on two sides of 1000000 sheets in an A4 transverse feeding mode.

After the durability test, another durability test was performed. An image of characters or string having an image area ratio of 6% was continuously printed on one side of each of 500000 sheets under an environment at a temperature of 30° C. and a humidity of 80% RH in an A4 transverse feeding mode. After these durability tests, a cyan halftone image was output. The halftone image was visually observed to evaluate image stripes (forwarding (FD) striations) caused by scratches on the surface of the photoreceptor. The image density of the halftone image measured with a Macbeth reflection densitometer "RD-918" (available from Gretag Macbeth GmbH) was 0.80. The image stripes were evaluated according to the following criteria. In the present invention, the rank A or B was determined to be acceptable. The results of evaluation are shown in Table III.

A: The halftone image has no visible defects of image stripes in the axial direction.

B: The halftone image has one to four visible defects of image stripes disposed in the axial direction and having a length of 1 cm in the axial direction and a width of less than 1 mm in the sheet feeding direction.

D: The halftone image has five or more visible defects of image stripes disposed in the axial direction and having a length of less than 1 cm in the axial direction and a width of less than 1 mm in the sheet feeding direction, or has one or more visible defects of image stripes disposed in the axial direction and having a length of 1 cm or more in the axial direction or a width 1 mm or more in the sheet feeding direction.

(3) Evaluation of Scattering of Toner

Two-component developers [D1] to [D26] were charged in sequence into the cyan developing unit in an imaging apparatus "bizhub PRESS C1070" (available from KONICA MINOLTA, INC.) to evaluate the scattering of the toner under an environment at normal temperature and normal humidity (temperature: 20° C., relative humidity: 50% RH).

A text image of cyan color having a coverage rate of 5% was printed on 200000 sheets of high quality paper (64 g/m$^2$) of a size A4. The scattering of the toner around the developing unit and the contamination within the developing unit by the scattering of the carrier were visually observed, and were evaluated according to the following criteria.

The scattering of the toner was evaluated according to the following criteria. In the present invention, the rank A, B, or C was determined to be acceptable. The results of evaluation are shown in Table III.

A: No scattering of the toner is found, and the hands of a user does not become dirty during exchange of the developing unit.

B: The toner scatters and adheres to the upper cover near the developing roller.

C: The toner scatters and adheres to part of the upper cover near the developing roller.

D: The toner significantly scatters such that the user needs to wash hands after replacement of the developing unit.

(4) Evaluation of Fogging

In the measurement of the fogging density, 20 absolute image densities of a blank sheet of white paper were measured with a Macbeth reflection densitometer "RD-918", and were averaged. The average was defined as the density of white paper.

In the next step, a text image of cyan color having a coverage rate of 5% was printed on 400000 sheets of high quality paper (64 g/m$^2$) of a size A4 with the apparatus and the printing conditions used in the evaluation of the scattering of the toner, and a solid white image was printed. Twenty absolute image densities of the solid white image were measured as in the white paper, and were averaged. The value obtained by subtracting the density of the white paper from the average density was defined as fogging density for evaluation. A fogging density of less than 0.010 has a level of practical use without problem. In the present invention, the rank A, B, or C was determined to be acceptable. The results of evaluation are shown in Table III.

A: A fogging density of less than 0.003

B: A fogging density of 0.003 or more and less than 0.005

C: A fogging density of 0.005 or more and less than 0.010

D: A fogging density of 0.010 or more

TABLE III

| | | Evaluation of average charge amount | | | | | Evaluation of Image | | | |
|---|---|---|---|---|---|---|---|---|---|---|
| | Environment at low temperature and low humidity *1 | | Environment at high temperature and high humidity *2 | | | | | | | |
| | | Average charge amount [−µC/g] | | Average charge amount [−µC/g] | *3 [µC/g] | | | Image stripes | Scattering of toner | |
| Toner | Developer | [−µC/g] | Developer | [−µC/g] | [µC/g] | Determination | Developer | stripes | of toner | Fogging | Notes |
| 1 | $D_L1$ | 45.1 | $D_H1$ | 43.2 | 1.9 | A | D1 | A | A | A | Example |
| 2 | $D_L2$ | 46.2 | $D_H2$ | 40.1 | 6.1 | B | D2 | B | B | B | Example |
| 3 | $D_L3$ | 47.7 | $D_H3$ | 45.0 | 2.7 | A | D3 | A | A | A | Example |
| 4 | $D_L4$ | 56.6 | $D_H4$ | 38.4 | 18.2 | B | D4 | B | B | B | Example |
| 5 | $D_L5$ | 45.7 | $D_H5$ | 39.8 | 5.9 | A | D5 | B | C | C | Example |
| 6 | $D_L6$ | 41.1 | $D_H6$ | 34.9 | 6.2 | A | D6 | B | C | C | Example |
| 7 | $D_L7$ | 52.1 | $D_H7$ | 41.2 | 10.9 | B | D7 | A | B | B | Example |
| 8 | $D_L8$ | 44.3 | $D_H8$ | 41.4 | 2.9 | A | D8 | A | B | B | Example |
| 9 | $D_L9$ | 44.5 | $D_H9$ | 42.5 | 2.0 | A | D9 | B | B | B | Example |
| 10 | $D_L10$ | 44.3 | $D_H10$ | 42.3 | 2.0 | A | D10 | A | A | A | Example |
| 11 | $D_L11$ | 44.1 | $D_H11$ | 41.7 | 2.4 | A | D11 | B | B | B | Example |
| 12 | $D_L12$ | 47.1 | $D_H12$ | 43.3 | 3.8 | A | D12 | B | A | A | Example |
| 13 | $D_L13$ | 48.2 | $D_H13$ | 43.0 | 5.2 | B | D13 | B | B | B | Example |
| 14 | $D_L14$ | 45.1 | $D_H14$ | 43.2 | 1.9 | A | D14 | A | A | A | Example |
| 15 | $D_L15$ | 41.3 | $D_H15$ | 35.7 | 5.6 | B | D15 | A | C | C | Example |
| 16 | $D_L16$ | 45.1 | $D_H16$ | 43.2 | 1.9 | A | D16 | A | A | A | Example |
| 17 | $D_L17$ | 48.1 | $D_H17$ | 41.2 | 6.9 | B | D17 | A | B | B | Example |
| 18 | $D_L18$ | 47.2 | $D_H18$ | 45.0 | 2.2 | A | D18 | B | B | B | Example |
| 19 | $D_L19$ | 48.3 | $D_H19$ | 40.1 | 8.2 | B | D19 | B | B | B | Example |
| 20 | $D_L20$ | 40.2 | $D_H20$ | 38.9 | 1.3 | A | D20 | B | B | B | Example |
| 21 | $D_L21$ | 38.1 | $D_H21$ | 32.1 | 6.0 | B | D21 | B | C | C | Example |
| 22 | $D_L22$ | 42.1 | $D_H22$ | 37.1 | 5.0 | B | D22 | A | B | B | Example |
| 23 | $D_L23$ | 39.2 | $D_H23$ | 35.8 | 3.4 | A | D23 | B | C | C | Example |
| 24 | $D_L24$ | 47.1 | $D_H24$ | 44.2 | 2.9 | A | D24 | D | B | B | Comparative Example |
| 25 | $D_L25$ | 45.3 | $D_H25$ | 43.2 | 1.9 | A | D25 | D | B | B | Comparative Example |
| 26 | $D_L26$ | 40.3 | $D_H26$ | 38.2 | 2.1 | A | D26 | D | D | D | Comparative Example |

*1: Temperature: 10° C. Relative humidity: 20% RH
*2: Temperature: 30° C. Relative humidity: 80% RH
*3: Difference between different environments Table III shows that the toners according to the present invention reduce the variation in charge amount under different temperatures and humidities, and can prevent image stripes, fogging, and scattering of the toner. In contrast, the toners according to Comparative Examples are inferior in any one of these evaluations.

Although embodiments of the present invention have been described and illustrated in detail, the disclosed embodiments are made for purposes of illustration and example only and not limitation. The scope of the present invention should be interpreted by terms of the appended claims.

The entire disclosure of Japanese patent application No. 2017-052518, filed on Mar. 17, 2017, is incorporated herein by reference in its entirety.

What is claimed is:

1. A toner for developing electrostatic images, comprising toner particles containing an external additive on surfaces of toner matrix particles,
    wherein the external additive contains at least a lanthanum-containing titanate compound.
2. The toner for developing electrostatic images according to claim 1,
    wherein the lanthanum-containing titanate compound has a number average primary particle diameter within the range of 10 to 100 nm.
3. The toner for developing electrostatic images according to claim 1,
    wherein the lanthanum-containing titanate compound has an average circularity within the range of 0.82 to 1.0.
4. The toner for developing electrostatic images according to claim 1,
    wherein the lanthanum-containing titanate compound has an average adhesion strength to surfaces of the toner matrix particles within the range of 50 to 100%.
5. The toner for developing electrostatic images according to claim 1,
    wherein the lanthanum-containing titanate compound contains 3.4 to 14.9 mass % of lanthanum.
6. The toner for developing electrostatic images according to claim 1,
    wherein the lanthanum-containing titanate compound contained is lanthanum-containing strontium titanate.
7. The toner for developing electrostatic images according to claim 1,
    wherein the lanthanum-containing titanate compound contained is lanthanum-containing calcium titanate.
8. The toner for developing electrostatic images according to claim 1,
    wherein the content of the lanthanum-containing titanate compound is within the range of 0.1 to 1.0 mass % relative to the total amount of the toner for developing electrostatic images.

9. The toner for developing electrostatic images according to claim 1,
wherein the content of titanium dioxide ($TiO_2$) is less than 0.1 mass % relative to the total amount of the toner for developing electrostatic images.

10. The toner for developing electrostatic images according to claim 1,
wherein the toner matrix particles contain at least a vinyl resin.

* * * * *